United States Patent
Kuse et al.

(10) Patent No.: US 11,976,344 B2
(45) Date of Patent: May 7, 2024

(54) CU-BASED ALLOY POWDER

(71) Applicant: Sanyo Special Steel Co., Ltd., Himeji (JP)

(72) Inventors: Tetsuji Kuse, Himeji (JP); Soichiro Maeda, Himeji (JP); Yuichi Nagatomi, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 714 days.

(21) Appl. No.: 17/059,544

(22) PCT Filed: Nov. 6, 2018

(86) PCT No.: PCT/JP2018/041200
§ 371 (c)(1),
(2) Date: Nov. 30, 2020

(87) PCT Pub. No.: WO2019/230018
PCT Pub. Date: Dec. 5, 2019

(65) Prior Publication Data
US 2021/0230717 A1 Jul. 29, 2021

(30) Foreign Application Priority Data
Jun. 1, 2018 (JP) ................. 2018-105934

(51) Int. Cl.
C22C 9/00 (2006.01)
B22F 1/052 (2022.01)
B33Y 70/00 (2020.01)
C22C 1/04 (2023.01)
C22C 1/047 (2023.01)
B22F 10/28 (2021.01)
B22F 10/36 (2021.01)
B22F 10/64 (2021.01)

(52) U.S. Cl.
CPC .......... *C22C 1/0425* (2013.01); *B22F 1/052* (2022.01); *B33Y 70/00* (2014.12); *C22C 1/047* (2023.01); *B22F 10/28* (2021.01); *B22F 10/36* (2021.01); *B22F 10/64* (2021.01); *C22C 9/00* (2013.01)

(58) Field of Classification Search
None
See application file for complete search history.

(56) References Cited

U.S. PATENT DOCUMENTS

| | | | |
|---|---|---|---|
| 8,329,092 B2 | 12/2012 | Fuwa et al. | |
| 9,067,262 B1 | 6/2015 | Deinzer | |
| 10,017,840 B2 | 7/2018 | Goto et al. | |
| 10,421,122 B2 | 9/2019 | Tsubota et al. | |
| 10,557,184 B2 | 2/2020 | Goto et al. | |
| 10,981,226 B2 | 4/2021 | Tsubota et al. | |
| 2015/0255195 A1 | 9/2015 | Muramatsu | |
| 2016/0332227 A1 | 11/2016 | Tsubota et al. | |
| 2017/0182557 A1 | 6/2017 | Tsubota et al. | |
| 2018/0111199 A1 | 4/2018 | Tsubota et al. | |
| 2018/0354033 A1 | 12/2018 | Morinaka et al. | |
| 2019/0194778 A1 | 6/2019 | Masuda et al. | |
| 2020/0122236 A1* | 4/2020 | Yoshida | B22F 1/05 |
| 2021/0230717 A1 | 7/2021 | Kuse et al. | |

FOREIGN PATENT DOCUMENTS

| | | |
|---|---|---|
| CN | 103074517 A | 5/2013 |
| CN | 106623953 A | 5/2017 |
| CN | 107971489 A | 5/2018 |
| CN | 109112346 A | 1/2019 |
| DE | 1031093 B | 5/1958 |
| EP | 2927913 A1 | 10/2015 |
| EP | 3135780 A1 | 3/2017 |
| EP | 3315229 A1 | 5/2018 |
| GB | 811507 A * | 4/1959 |
| JP | 2001131655 A | 5/2001 |
| JP | 2005314806 A | 11/2005 |
| JP | 4661842 B2 | 3/2011 |
| JP | 2016125102 A | 7/2016 |
| JP | 2016183401 A | 10/2016 |
| JP | 2016211062 A | 12/2016 |
| JP | 2017115220 A | 6/2017 |
| JP | 6296558 B2 | 3/2018 |
| WO | 2014083977 A1 | 6/2014 |
| WO | 2016181924 A1 | 11/2016 |
| WO | 2018043681 A1 | 3/2018 |
| WO | 2018079002 A1 | 5/2018 |

(Continued)

OTHER PUBLICATIONS

Anderson et al., "Microstructural Size Effects in High-Strength High-Conductivity Cu—Cr—Nb Alloys," Metallurgical and Materials Transactions A, 2001, pp. 1211-1224, vol. 32(A).

Jadhav et al., "SLM of CuNi10 using in-house gas atomised powder," Department of Materials Engineering (MTM), KU Leuven, 2017, pp. 1-16.

Muramatsu et al., "Microstructures and Mechanical and Electrical Properties of Hypoeutectic Cu-1, C-3, and Cu-5 at % Zr Alloy Wires Preprocessed by Spark Plasma Sintering," Materials Transactions, 2013, pp. 1213-1219, vol. 54:7.

Zhang et al., "Microstructure and properties of high strength and high conductivity Cu—Cr alloy components fabricated by high power selective laser melting," Materials Letters, 2019, pp. 306-309, vol. 237.

*Primary Examiner* — George Wyszomierski
(74) *Attorney, Agent, or Firm* — The Webb Law Firm

(57) ABSTRACT

A Cu-based alloy powder is provided that is suitable for a process involving rapid-melting and rapid-solidification and can produce a shaped article having superior properties. The powder is made of a Cu-based alloy. The Cu-based alloy includes 0.1 to 5.0 mass % of at least one element M selected from V, Fe, Zr, Nb, Hf, and Ta. The balance in the alloy is Cu and inevitable impurities. The powder has a ratio D50/TD of a mean particle diameter D50 (μm) to a tap density TD (Mg/m$^3$) in a range of 0.2×10$^{-5}$·m$^4$/Mg to 20×10$^{-5}$·m$^4$/Mg.

4 Claims, No Drawings

(56) References Cited

FOREIGN PATENT DOCUMENTS

| WO | 2018123809 A1 | 7/2018 |
| WO | 2018199110 A1 | 11/2018 |
| WO | 2019230018 A1 | 12/2019 |

\* cited by examiner

US 11,976,344 B2

CU-BASED ALLOY POWDER

CROSS-REFERENCE TO RELATED APPLICATIONS

This application is the U.S. national phase of International Application No. PCT/JP2018/041200 filed Nov. 6, 2018, and claims priority to Japanese Patent Application No. 2018-105934 filed Jun. 1, 2018, the disclosures of which are hereby incorporated by reference in their entirety.

TECHNICAL FIELD

The present invention relates to metal powder suitable for a rapid-melting and rapid-solidification process, such as three-dimensional additive manufacturing, thermal spraying, laser coating, and weld overlaying. The present invention more specifically relates to a powder made of Cu-based alloy.

BACKGROUND ART

Three-dimensional (3D) printers are used in manufacturing shaped metal articles. In these 3D printers, the shaped articles are manufactured by additive manufacturing process. In the additive manufacturing process, spread metal powder is irradiated with a laser beam or an electron beam. This irradiation melts particles of the metal powder and the particles then solidify. Such particles are bonded to each other through the melting and the subsequent solidification. Irradiation is selectively applied to some portions of the metal powder. Unirradiated portions of the powder do not melt. Bonded layers can be formed only in the irradiated portions.

Additional metal powder is spread over the bonded layers. This metal powder is irradiated with a laser beam or an electron beam. This irradiation melts particles of the additional metal powder, and the particles then solidify. Such particles are bonded to each other through the melting and the subsequent solidification, and fresh bonded layers can be formed. The fresh bonded layers are also connected to the bonded layers previously formed.

Repetition of the bonding by irradiation causes an aggregate of the bonded layers to gradually grow. Such growth produces a three-dimensional shaped article. A complicatedly shaped article can be readily produced by the additive manufacturing process. Patent Document 1 (JP4661842B) discloses an exemplary additive manufacturing process.

Metal alloys used, for example, in heatsinks for cooling motors are required to have high conductivities. Cu-based alloys are suitable for such applications.

Patent Document 2 (JP6296558B) discloses a Cu-based alloy composed mainly of Cu and containing Zr. The content of Zr in the Cu-based alloy is 5 to 8 atom %.

Patent Document 3 (JP2005-314806A) discloses a nanocrystalline powder composed mainly of Cu and containing Zr. The content of Zr in the Cu alloy, which is a material of the powder, is 0.05 to 45 mass %. The powder has a particle size of 2 to 1000 nm.

CITATION LIST

PATENT LITERATURES

Patent Document 1: JP4661842B
Patent Document 2: JP6296558B
Patent Document 3: JP2005-314806A

SUMMARY OF INVENTION

In an additive manufacturing process, a metal material is rapidly melted and then rapidly solidified. Conventional Cu-based alloys are unsuitable for powder used in processes involving such rapid-melting and rapid-solidification. For example, highly dense shaped articles cannot be readily produced from conventional Cu-based alloy powder. The conventional Cu-based alloys are also unsuitable for other types of processes involving rapid-melting and rapid-solidification, such as thermal spraying, laser coating, and weld overlaying.

An object of the present invention is to provide a Cu-based alloy powder that is suitable for a process involving rapid-melting and rapid-solidification and can produce a shaped article having superior properties.

The present invention provides the following items:

1. A powder made of a Cu-based alloy comprising 0.1 to 5.0 mass % of at least one element M selected from the group consisting of V, Fe, Zr, Nb, Hf, and Ta, the balance being Cu and inevitable impurities,
wherein the powder has a ratio D50/TD of a mean particle diameter D50 ($\mu$m) to a tap density TD (Mg/m$^3$) in a range of $0.2\times10^{-5}\cdot$m$^4$/Mg to $20\times10^{-5}\cdot$m$^4$/Mg.

2. The powder according to item 1, wherein the Cu-based alloy comprises 0.1 to 2.0 mass % of Zr.

3. A shaped article produced from a powder made of a Cu-based alloy, wherein:
the Cu-based alloy comprises 0.1 to 5.0 mass % of at least one element M selected from the group consisting of V, Fe, Zr, Nb, Hf, and Ta, the balance being Cu and inevitable impurities,
the powder has a ratio D50/TD of a mean particle diameter D50 ($\mu$m) to a tap density TD (Mg/m$^3$) in a range of $0.2\times10^{-5}\cdot$m$^4$/Mg to $20\times10^{-5}\cdot$m$^4$/Mg,
the shaped article comprises a matrix phase comprising Cu as a main component and a precipitate formed in the matrix phase, and
the precipitate is composed of an element M single phase and/or a compound $Cu_XM_Y$, where X and Y each represent a natural number and a ratio X/Y of X to Y is 1.0 to 5.0.

4. The shaped article according to item 3, wherein the precipitate has a size of 0.01 to 20 $\mu$m.

A shaped article having superior properties can be produced from the Cu-based alloy powder of the present invention through a process involving rapid-melting and rapid-solidification.

DESCRIPTION OF EMBODIMENTS

The powder of the present invention comprises agglomerates of multiple particles. The particles are made of a Cu-based alloy. The Cu-based alloy contains at least one element M selected from the group consisting of V, Fe, Zr, Nb, Hf, and Ta. The balance in the alloy are Cu and inevitable impurities.

Pure Cu has high laser reflectance compared to Fe-based alloys, Ni-based alloys, Co-based alloys, and the like. When pure Cu powder is used in a process involving rapid-melting and rapid-solidification, a large amount of heat is released due to such high laser reflectance. Thus, sufficient heat for melting the powder cannot be applied to the powder. The lack in heat leads to incomplete bonding between particles. In detail, the lack in heat causes unmelted particles to remain in a shaped article produced from the powder. The shaped article has a low relative density.

Irradiation of the pure Cu powder with a laser beam having a high energy density suppresses the remaining unmelted particles. Unfortunately, the laser beam having a high energy density leads to bumping of the melted metal. The bumping causes voids in the shaped article.

The present inventors, who have conducted extensive study, have found that addition of a predetermined amount of V, Fe, Zr, Nb, Hf, or Ta in Cu makes it possible to produce a highly dense shaped article. The shaped article has a high electric conductivity.

[Element M]

The element M is selected from the group consisting of vanadium (V), iron (Fe), zirconium (Zr), niobium (Nb), hafnium (Hf), and tantalum (Ta). V, Fe, Zr, Nb, Hf, and Ta each have a low solid solubility limit in Cu on an equilibrium diagram. The element M can however be supersaturatedly dissolved in Cu if powder is produced by a process involving rapid solidification, such as atomization. The oversaturated solid solution suppresses the reflectance of laser light. The powder subjected to a process involving rapid-melting and rapid-solidification is less likely to release heat into the air. Thus, a shaped article having a high relative density can be produced. A particularly preferred element M is Zr.

[Content of Element M]

The total content P of the element(s) M is preferably 0.1 to 5.0 mass %. A shaped article having a high relative density can be produced from the powder containing the element(s) M in a total content P of 0.1 mass % or more. In this respect, the total content P is more preferably 0.3 mass % or more, particularly preferably 0.5 mass % or more. A shaped article having a high electric conductivity can be produced from the powder containing the element(s) M in a total content P of 5.0 mass % or less. In this respect, the total content P is more preferably 3.0 mass % or less, particularly preferably 2.0 mass % or less. In consequence, a preferred total content P of the element(s) M is preferably 0.1 to 5.0 mass %, more preferably 0.3 to 3.0 mass %, particularly preferably 0.5 to 2.0 mass %. It is preferred that the alloy contains 0.1 to 2.0 mass % of Zr.

[Particle Diameter of Powder]

The powder preferably has a mean particle diameter D50 of 15 to 50 µm. The powder having a mean particle diameter D50 of 15 µm or more has high fluidity. In this respect, the powder more preferably has a mean particle diameter D50 of 20 µm or more, particularly preferably 25 µm or more. A shaped article having a high relative density can be produced from the powder having a mean particle diameter D50 of 50 µm or less. In this respect, the powder more preferably has a mean particle diameter D50 of 40 µm or less, particularly preferably 30 µm or less. In consequence, the powder preferably has a mean particle diameter D50 of 15 to 50 µm, more preferably 20 to 40 µm, particularly preferably 25 to 30 µm.

In the measurement of the mean particle diameter D50, a cumulative curve of particles is plotted where the total volume of the powder is 100%, and the particle diameter at a cumulative volume of 50% is defined as a mean particle diameter D50. The mean particle diameter D50 is measured by laser diffraction scattering. A device suitable for this measurement is a laser diffraction/scattering type particle size distribution measuring device "Microtrack MT3000" available from Nikkiso Co., Ltd. Powder are poured together with pure water into the cell of this device, and then the particle diameter is determined based on light scattering data on the particles.

[Tap Density]

From the viewpoint of ease in producing shaped articles, the powder has a tap density of preferably 0.10 to 0.40 $Mg/m^3$, particularly preferably 0.15 to 0.35 $Mg/m^3$.

The tap density is measured in accordance with "JIS Z 2512." In the measurement, about 50 g of powder is filled into a cylinder having a volume of 100 $cm^3$ to measure the density. The measurement conditions are as follows:

Drop height: 10 mm
Number of tapping cycles: 200

[D50/TD]

The ratio D50/TD ($10^{-5} \cdot m^4/Mg$) of the mean particle diameter D50 (µm) to the tap density TD ($Mg/m^3$) is preferably 0.2 to 20. A powder having a ratio D50/TD ($10^{-5} \cdot m^4/Mg$) of 0.2 or more has high fluidity. In this respect, the ratio D50/TD ($10^{-5} \cdot m^4/Mg$) is more preferably 0.5 or more, particularly preferably 5 or more. A shaped article with a high relative density can be produced from the powder having a ratio D50/TD ($10^{-5} \cdot m^4/Mg$) of 20 or less. In this respect, the ratio D50/TD ($10^{-5} \cdot m^4/Mg$) is more preferably 18 or less, particularly preferably 15 or less. In consequence, the ratio D50/TD ($10^{-5} \cdot m^4/Mg$) is preferably 0.2 to 20, more preferably 0.5 to 18, particularly preferably 5 to 15.

[Production of Powder]

Examples of processes for manufacturing the powder include water atomization, single-roll quenching, twin-roll quenching, gas atomization, disk atomization, and centrifugal atomization. Preferred are single-roll quenching, gas atomization, and disk atomization. The powder may be subjected to mechanical milling or the like. Examples of the milling process include ball milling, bead milling, planet ball milling, attritor milling, and vibrating ball milling.

[Shaping]

Various shaped articles can be manufactured from the metal powder according to the present invention. A method of manufacturing a shaped article includes the steps of:

(1) providing metal powder, and
(2) melting and then solidifying the metal powder to produce an unheated shaped article. The step of melting and then solidifying the metal powder may include a rapid-melting and rapid-solidification process. Specific examples of the process include three-dimensional additive manufacturing, thermal spraying, laser coating, and a weld overlaying. In particular, the inventive metal powder is suitable for the three-dimensional additive manufacturing process.

3D printers can be used in the additive manufacturing process. In the additive manufacturing process, the spread metal powder is irradiated with a laser beam or an electron beam. Upon irradiation, the particles in the powder are rapidly heated to rapidly melt and then to rapidly solidify. The particles are bonded to each other through the melting and the subsequent solidification. Some portions of the metal powder are selectively irradiated. The unirradiated portions of the powder do not melt. A bonded layer is formed only in the irradiated portions.

Additional metal powder is spread over the bonded layer. This metal powder is also irradiated with a laser beam or an electron beam. Upon irradiation, the particles in the powder rapidly melt and then rapidly solidify. The particles in the powder are bonded to each other through the melting and the subsequent solidification, and a fresh bonded layer is formed. The fresh bonded layer is also connected to the existing bonded layer.

Repetition of bonding by irradiation allows an aggregate of the bonded layers to gradually grow. This growth leads to a three-dimensional shaped article. This additive manufacturing process makes it possible to easily produce a complicatedly shaped article.

[Conditions of Shaping]

The energy density E.D. is preferably 80 to 350 J/mm$^3$ during sintering in a rapid-melting and rapid-solidification process, such as an additive manufacturing process. When the energy density E.D. is 80 J/mm$^3$ or more, sufficient heat is supplied to the powder. Thus, remaining unmelted powder in the shaped article is suppressed. Such a shaped article has a high relative density. From this viewpoint, the energy density E.D. is more preferably 90 J/mm$^3$ or more, particularly preferably 100 J/mm$^3$ or more. When the energy density E.D. is 350 J/mm$^3$ or less, excess heat is not applied to the powder. Thus, bumping of the melted metal and formation of voids in the shaped article can be suppressed. From this viewpoint, the energy density E.D. is preferably 340 J/mm$^3$ or less, particularly preferably 330 J/mm$^3$ or less.

[Relative Density]

The shaped article produced by a rapid-melting and rapid-solidification process (in other words, the shaped article before undergoing a heat treatment, which will be described below) has a relative density of preferably 90% or more. This unheated shaped article has a high dimensional accuracy and electric conductivity. The relative density is more preferably 93% or more, further preferably 95% or more.

The relative density is calculated from the ratio of the density of a test piece of 10 mm cube produced by an additive manufacturing process or the like to the bulk density of the raw powder. The density of the test piece of 10 mm cube is measured by Archimedes' method. The bulk density of the raw powder is measured by a dry densitometer.

[Heat Treatment]

Preferably, the method of manufacturing the shaped articles further comprises the step of (3) subjecting the unheated shaped article prepared in the step (2) to a heat treatment to produce a shaped article. A preferred heat treatment is an aging treatment.

The aging treatment forms a precipitate in the matrix phase of the shaped article. The precipitate is mainly formed at grain boundaries. The precipitate is composed of an element M single phase and/or a compound $Cu_XM_Y$ where X and Y each represent a natural number. The natural number is a positive integer.

The ratio X/Y of X to Y in the formula of $Cu_XM_Y$ is preferably 1.0 or more. A compound $Cu_XM_Y$ with a ratio X/Y of 1.0 or more is less likely to inhibit the electric conductivity. From this viewpoint, the ratio X/Y is more preferably 2.0 or more, particularly preferably 2.5 or more. The ratio X/Y is preferably 5.0 or less. A compound $Cu_XM_Y$ with a ratio X/Y of 5.0 or less is less likely to inhibit the electric conductivity. In consequence, the ratio X/Y is preferably 1.0 to 5.0, more preferably 2.0 to 5.0, particularly preferably 2.5 to 5.0.

[Conditions of Heat Treatment]

During the aging, the untreated shaped article is kept at a predetermined temperature for a predetermined time. The aging temperature is preferably 350 to 1000° C. Aging at 350° C. or more can produce a structure in which the element M single phase and/or the compound $Cu_XM_Y$ are sufficiently formed. The shaped article having such a structure has a high strength. From this viewpoint, the aging temperature is more preferably 400° C. or more, particularly preferably 450° C. or more. The aging at 1000° C. or less can suppress solid solution of the alloy elements into the matrix phase. From this viewpoint, the aging temperature is more preferably 950° C. or less, particularly preferably 900° C. or less.

The aging time is preferably 1 to 10 hours. The aging for 1 hour or more can produce a structure in which the element M single phase and/or the compound $Cu_XM_Y$ are sufficiently formed. The shaped article having such a structure has high strength. From this viewpoint, the aging time is more preferably 1.3 hours or more, particularly preferably 1.5 hours or more. The aging for 10 hours or less can suppress the energy cost. From this viewpoint, the aging time is more preferably 9.7 hours or less, particularly preferably 9.5 hours or less.

[Size of Precipitate]

The precipitate (the element M single phase and/or the compound $Cu_XM_Y$) has a size of preferably 0.01 to 20 μm. A shaped article having a high relative density can be produced from a powder containing a precipitate with a size of 0.01 μm or more. From this viewpoint, the size of the precipitate is more preferably 0.1 μm or more, particularly preferably 0.5 μm or more. A high electric conductivity can be produced from the powder containing a precipitate with a size of 20 μm or less. From this viewpoint, the size of the precipitate is more preferably 11 μm or less, particularly preferably 7 μm or less. Therefore, the precipitate has a size of preferably 0.01 to 20 μm, more preferably 0.1 to 11 μm, particularly preferably 0.5 to 7 μm.

[Electric Conductivity of Shaped Article]

The shaped article after heat treatment preferably has an electric conductivity of 30% IACS or more. A shaped article having an electric conductivity of 30% IACS or more is highly conductive. From this viewpoint, the shaped article has an electric conductivity of more preferably 40% IACS or more, particularly preferably 50% IACS or more.

EXAMPLES

The following examples will demonstrate the advantageous effects of the present invention, although the invention should not be construed as being limited to the description of the examples.

[Production of Powder]

In each example, a material having a predetermined composition was heated to melt in an alumina crucible by high-frequency induction heating under vacuum. The molten metal was dropped through a nozzle with a diameter of 5 mm at the bottom of the crucible. Argon gas or nitrogen gas was sprayed to the molten metal to form a Cu-based alloy powder. Tables 1 to 3 show the details of the compositions of powders.

[Forming]

Each of the powders was used as raw material for an additive manufacturing process using a three-dimensional additive manufacturing system (EOS-M280) to produce an unheated shaped article. Tables 1 to 3 show energy densities E.D. in the additive manufacturing process. The shaped articles were each a cube with a side of 10 mm.

[Heat Treatment]

Unheated shaped articles were subjected to a heat treatment (aging treatment). Tables 1 to 3 below show the aging temperature and aging time.

[Identification of Precipitate]

A test piece with dimensions of 10 mm cube (10×10×10 mm) of each Example was processed with a focused ion beam (FIB) to form a thin film of the test piece. The resulting thin film was observed with a transmission electron microscope (TEM) to identify the composition and size of the compound at ten locations (each location had an area of 2 μm×2 μm) selected arbitrarily. Tables 1 to 3 below show the results.

[Measurement of Electric Conductivity]

Test pieces each having dimensions of 3×2×60 mm were prepared. The electric resistance (Ω) of each test piece was measured by a four terminal method in accordance with "JIS C 2525" using a measurement system "TER-2000RH" available from ULVAC-RIKO, Inc. under the following conditions:

Temperature: 25° C.
Current: 4A
Voltage drop distance: 40 mm.

The electric resistivity ρ (Ωm) was calculated by the following expression:

$$\rho = R/I \times S$$

where R represents the electric resistance (Ω) of the test piece, I representing the current (A), and S representing the cross-sectional area (m$^2$) of the test piece. The electric conductivity (S/m) was calculated from the reciprocal of the electric resistivity ρ. The electric conductivity (% IACS) of each test piece was calculated where 5.9×10$^7$(S/m) was defined as 100% IACS. Tables 1 to 3 below show the results.

[Rating]

The powders were rated on the following criteria:

Rating 1: The powder satisfies both of the following conditions (a) and (b):
(a) electric conductivity≥90% IACS, and
(b) 0.2≤D50/TD≤20;

Rating 2: The powder satisfies both of the following conditions (a) and (b):
(a) 70% IACS≤electric conductivity<90% IACS, and
(b) 0.2≤D50/TD≤20;

Rating 3: The powder satisfies both of the following conditions (a) and (b):
(a) 50% IACS≤electric conductivity<70% IACS, and
(b) 0.2≤D50/TD≤20;

Rating 4: The powder satisfies both of the following conditions (a) and (b):
(a) 30% IACS≤electric conductivity<50% IACS, and
(b) 0.2≤D50/TD≤20; and Rating 5: The powder satisfies any of the following conditions (a) to (c):
(a) electric conductivity<30% IACS,
(b) D50/TD<0.2, or
(c) D50/TD>20.

[Table 1]

TABLE 1

| | Element and content (mass %) | | | | | P (mass %) | TD (Mg/m$^3$) | D50/TD (10$^{-5}$m$^{4/}$Mg) | E.D. (J/mm$^3$) | Relative density (%) | Heat Treatment Temp. (° C.) | Time (h) | X/Y | Compound Size (μm) | Electric Conductivity (% IACS) | Rating |
|---|---|---|---|---|---|---|---|---|---|---|---|---|---|---|---|---|---|
| Ex. 1 | V | 0.1 | — | — | — | — | 0.1 | 0.4 | 12 | 120 | 95.8 | 500 | 5 | 4.5 | 0.5 | 35 | 4 |
| Ex. 2 | V | 5.0 | — | — | — | — | 5.0 | 0.4 | 14 | 120 | 99.4 | 500 | 5 | 4.0 | 2 | 70 | 2 |
| Ex. 3 | Fe | 0.1 | — | — | — | — | 0.1 | 0.4 | 10 | 120 | 95.6 | 500 | 5 | 3.5 | 3 | 35 | 4 |
| Ex. 4 | Fe | 5.0 | — | — | — | — | 5.0 | 0.5 | 12 | 120 | 99.3 | 500 | 5 | 4.5 | 0.5 | 75 | 2 |
| Ex. 5 | Zr | 0.1 | — | — | — | — | 0.1 | 0.5 | 14 | 120 | 98.5 | 500 | 5 | 4.0 | 2 | 90 | 1 |
| Ex. 6 | Zr | 5.0 | — | — | — | — | 5.0 | 0.5 | 10 | 120 | 99.8 | 500 | 5 | 3.5 | 3 | 85 | 2 |
| Ex. 7 | Nb | 0.1 | — | — | — | — | 0.1 | 0.5 | 0.2 | 80 | 92.0 | 500 | 5 | 5.0 | 0.1 | 25 | 5 |
| Ex. 8 | Nb | 5.0 | — | — | — | — | 5.0 | 0.5 | 0.5 | 80 | 98.4 | 500 | 5 | 4.0 | 3 | 45 | 4 |
| Ex. 9 | Hf | 0.1 | — | — | — | — | 0.1 | 0.5 | 10 | 120 | 91.9 | 500 | 5 | 3.5 | 5 | 28 | 5 |
| Ex. 10 | Hf | 5.0 | — | — | — | — | 5.0 | 0.5 | 15 | 120 | 99.9 | 500 | 5 | 3.5 | 0.01 | 50 | 3 |
| Ex. 11 | Ta | 0.1 | — | — | — | — | 0.1 | 0.4 | 12 | 120 | 93.4 | 500 | 5 | 3.0 | 1 | 23 | 5 |
| Ex. 12 | Ta | 5.0 | — | — | — | — | 5.0 | 0.5 | 12 | 120 | 98.3 | 500 | 5 | 2.0 | 2 | 80 | 2 |
| Ex. 13 | V | 1.0 | Nb | 0.5 | — | — | 1.5 | 0.4 | 10 | 120 | 98.5 | 500 | 1 | 3.0 | 0.01 | 45 | 4 |
| Ex. 14 | V | 1.0 | Ta | 3.0 | — | — | 4.0 | 0.4 | 8 | 120 | 99.0 | 500 | 3 | 2.0 | 1 | 60 | 3 |
| Ex. 15 | Fe | 1.0 | Nb | 0.5 | — | — | 1.5 | 0.6 | 12 | 120 | 98.3 | 500 | 5 | 1.0 | 2 | 65 | 3 |
| Ex. 16 | Fe | 1.0 | Hf | 3.0 | — | — | 4.0 | 0.6 | 12 | 120 | 99.0 | 500 | 5 | 4.5 | 1 | 70 | 2 |
| Ex. 17 | Zr | 1.0 | V | 0.5 | — | — | 1.5 | 0.4 | 14 | 120 | 97.8 | 800 | 5 | 4.0 | 5 | 85 | 2 |
| Ex. 18 | Zr | 1.0 | Fe | 3.0 | — | — | 4.0 | 0.4 | 13 | 120 | 99.2 | 1000 | 5 | 3.5 | 7 | 90 | 1 |
| Ex. 19 | Nb | 1.0 | Zr | 0.5 | — | — | 1.5 | 0.5 | 15 | 120 | 96.0 | 500 | 5 | 3.5 | 0.01 | 40 | 4 |

[Table 2]

TABLE 2

| | Element and content (mass %) | | | | | | P (mass %) | TD (Mg/m$^3$) | D50/TD (10$^{-5}$m$^{4/}$Mg) | E.D. (J/mm$^3$) | Relative density (%) | Heat Treatment Temp. (° C.) | Time (h) | X/Y | Compound Size (μm) | Electric Conductivity (% IACS) | Rating |
|---|---|---|---|---|---|---|---|---|---|---|---|---|---|---|---|---|---|---|
| Ex. 20 | Nb | 1.0 | Ta | 3.0 | — | — | | 4.0 | 0.5 | 12 | 120 | 98.4 | 500 | 5 | 3.0 | 1 | 55 | 3 |
| Ex. 21 | V | 1.0 | Fe | 0.5 | Zr | 0.5 | | 2.0 | 0.3 | 12 | 120 | 99.5 | 350 | 10 | 2.0 | 2 | 60 | 3 |
| Ex. 22 | V | 1.0 | Zr | 0.5 | Nb | 0.5 | | 2.0 | 0.2 | 10 | 120 | 98.4 | 500 | 5 | 3.5 | 0.01 | 65 | 3 |
| Ex. 23 | Fe | 1.0 | Zr | 0.5 | Ta | 0.5 | | 2.0 | 0.4 | 8 | 120 | 98.6 | 500 | 5 | 2.0 | 4 | 55 | 3 |
| Ex. 24 | Fe | 1.0 | Nb | 0.5 | Ta | 0.5 | | 2.0 | 0.4 | 12 | 120 | 98.3 | 500 | 5 | 1.0 | 2 | 60 | 3 |
| Ex. 25 | Zr | 1.0 | Nb | 0.5 | Ta | 0.5 | | 2.0 | 0.4 | 15 | 120 | 98.3 | 500 | 5 | 4.5 | 0.5 | 80 | 2 |
| Ex. 26 | Zr | 1.0 | Hf | 0.5 | Ta | 0.5 | | 2.0 | 0.4 | 18 | 120 | 99.9 | 500 | 5 | 3.5 | 7 | 85 | 2 |

TABLE 2-continued

| | Element and content (mass %) | | | | | | P (mass %) | TD (Mg/m³) | D50/TD (10⁻⁵m⁴/Mg) | E.D. (J/mm³) | Relative density (%) | Heat Treatment Temp. (° C.) | Heat Treatment Time (h) | X/Y | Compound Size (μm) | Electric Conductivity (% IACS) | Rating |
|---|---|---|---|---|---|---|---|---|---|---|---|---|---|---|---|---|---|
| Ex. 27 | Nb | 1.0 | Ta | 0.5 | V | 0.5 | 2.0 | 0.4 | 5 | 350 | 96.0 | 500 | 5 | 3.5 | 11 | 60 | 3 |
| Ex. 28 | Nb | 1.0 | Fe | 0.5 | V | 0.5 | 2.0 | 0.4 | 20 | 350 | 96.5 | 500 | 5 | 2.5 | 2 | 60 | 3 |
| Comp Ex. 1 | Ti | 1.0 | — | — | — | — | 0.0 | 0.5 | 7 | 120 | 98.6 | 500 | 5 | 3.5 | 0.05 | 20 | 5 |
| Comp Ex. 2 | Ti | 5.0 | — | — | — | — | 0.0 | 0.5 | 10 | 120 | 99.4 | 500 | 5 | 2.0 | 5 | 25 | 5 |
| Comp Ex. 3 | Co | 1.0 | — | — | — | — | 0.0 | 0.5 | 8 | 120 | 98.5 | 500 | 5 | 3.5 | 0.08 | 18 | 5 |
| Comp Ex. 4 | Co | 5.0 | — | — | — | — | 0.0 | 0.5 | 9 | 120 | 99.8 | 500 | 5 | 4.0 | 4 | 20 | 5 |
| Comp Ex. 5 | Ni | 1.0 | — | — | — | — | 0.0 | 0.5 | 11 | 120 | 98.3 | 500 | 5 | 2.0 | 0.05 | 15 | 5 |
| Comp Ex. 6 | Ni | 5.0 | — | | — | — | 0.0 | 0.5 | 12 | 120 | 99.4 | 500 | 5 | 0.5 | 7 | 20 | 5 |
| Comp Ex. 7 | Cd | 1.0 | — | — | — | — | 0.0 | 0.5 | 15 | 120 | 98.5 | 500 | 5 | 2.5 | 0.1 | 25 | 5 |
| Comp Ex. 8 | Cd | 5.0 | — | — | — | — | 0.0 | 0.5 | 21 | 120 | 99.3 | 500 | 5 | 3.0 | 3 | 30 | 5 |
| Comp Ex. 9 | Zr | 1.0 | Al | 0.1 | — | — | 1.0 | 0.5 | 9 | 120 | 98.0 | 500 | 5 | 2.5 | 0.1 | 40 | 5 |
| Comp Ex. 10 | Zr | 1.0 | Al | 4.0 | — | — | 1.0 | 0.5 | 8 | 120 | 98.7 | 500 | 5 | 0.5 | 4 | 45 | 5 |

[Table 3]

TABLE 3

| | Element and content (mass %) | | | | | | P (mass %) | TD (Mg/m³) | D50/TD (10⁻⁵m⁴/Mg) | E.D. (J/mm³) | Relative density (%) | Heat Treatment Temp. (° C.) | Heat Treatment Time (h) | X/Y | Compound Size (μm) | Electric Conductivity (% IACS) | Rating |
|---|---|---|---|---|---|---|---|---|---|---|---|---|---|---|---|---|---|
| Comp Ex. 11 | Zr | 1.0 | Mg | 0.1 | — | — | 1.0 | 0.4 | 11 | 120 | 98.4 | 500 | 5 | 2.0 | 0.3 | 30 | 5 |
| Comp Ex. 12 | Zr | 1.0 | Mg | 4.0 | — | — | 1.0 | 0.4 | 10 | 120 | 99.2 | 500 | 5 | 2.0 | 3 | 35 | 5 |
| Comp 13 Ex. | Fe | 1.0 | Mn | 0.1 | — | — | 1.0 | 0.5 | 6 | 120 | 98.0 | 500 | 5 | 2.5 | 0.3 | 28 | 5 |
| Comp 14 Ex. | Fe | 1.0 | Mn | 4.0 | — | — | 1.0 | 0.5 | 5 | 120 | 99.6 | 500 | 5 | 3.5 | 5 | 30 | 5 |
| Comp 15 Ex. | Fe | 1.0 | Ga | 0.1 | — | — | 1.0 | 0.5 | 9 | 120 | 99.1 | 500 | 5 | 2.0 | 0.3 | 35 | 5 |
| Comp 16 Ex. | Fe | 1.0 | Ga | 4.0 | — | — | 1.0 | 0.5 | 12 | 120 | 99.7 | 500 | 5 | 3.5 | 7 | 38 | 5 |
| Comp 17 Ex. | Ti | 1.0 | V | 1.0 | Nb | 1.0 | 2.0 | 0.5 | 10 | 120 | 99.4 | 500 | 5 | 4.0 | 0.2 | 54 | 5 |
| Comp Ex. 18 | Co | 1.0 | V | 1.0 | Nb | 1.0 | 2.0 | 0.5 | 8 | 120 | 99.5 | 500 | 5 | 2.5 | 4 | 50 | 5 |
| Comp Ex. 19 | Ni | 1.0 | Fe | 1.0 | Hf | 1.0 | 2.0 | 0.5 | 15 | 120 | 99.9 | 500 | 5 | 3.0 | 40 | 44 | 5 |
| Comp Ex. 20 | Cd | 1.0 | Fe | 1.0 | Hf | 1.0 | 2.0 | 0.5 | 10 | 120 | 98.7 | 500 | 5 | 4.5 | 3 | 46 | 5 |
| Comp Ex. 21 | Mg | 1.0 | Zr | 1.0 | Ta | 1.0 | 2.0 | 0.5 | 12 | 120 | 99.9 | 500 | 5 | 6.0 | 4 | 50 | 5 |
| Comp 22 Ex. | Mn | 1.0 | Zr | 1.0 | Ta | 1.0 | 2.0 | 0.5 | 15 | 120 | 99.9 | 500 | 5 | 6.0 | 45 | 35 | 5 |

The results in Tables 1 to 3 evidentially demonstrate advantageous effects of the present invention.

The powder according to the present invention is also suitable for 3D printers that discharge powder from nozzles. The powder is also suitable for laser coating processes involving discharge of powder from nozzles.

The invention claimed is:

1. A powder made of a Cu-based alloy comprising 0.1 to 5.0 mass % of at least two elements M selected from the group consisting of V, Fe, Zr, Nb, Hf, and Ta, the balance being Cu and inevitable impurities, wherein the powder has a ratio D50/TD of a mean particle diameter D50 (μm) to a tap density TD (Mg/m³) in a range of $0.2 \times 10^{-5}$ m⁴/Mg to $20 \times 10^{-5}$ m⁴/Mg.

2. The powder according to claim 1, wherein the Cu-based alloy comprises 0.1 to 2.0 mass % of Zr.

3. A shaped article produced from a powder made of a Cu-based alloy, wherein:
the Cu-based alloy comprises 0.1 to 5.0 mass % of at least two elements M selected from the group consisting of V, Fe, Zr, Nb, Hf, and Ta, the balance being Cu and inevitable impurities, the powder has a ratio D50/TD of a mean particle diameter D50 (μm) to a tap density TD (Mg/m$^3$) in a range of $0.2 \times 10^{-5}$·m$^4$/Mg to $20 \times 10^{-5}$·m$^4$/Mg, the shaped article comprises a matrix phase comprising Cu as a main component and a precipitate formed in the matrix phase, and the precipitate is composed of an element M single phase and/or a compound $Cu_X M_Y$, where X and Y each represent a natural number and a ratio X/Y of X to Y is 1.0 to 5.0.

4. The shaped article according to claim 3, wherein the precipitate has a size of 0.01 to 20 μm.

* * * * *